United States Patent [19]

Mueller et al.

[11] 4,220,010
[45] Sep. 2, 1980

[54] LOSS OF REFRIGERANT AND/OR HIGH DISCHARGE TEMPERATURE PROTECTION FOR HEAT PUMPS

[75] Inventors: Dale A. Mueller, St. Paul; Stephen L. Serber, New Hope, both of Minn.

[73] Assignee: Honeywell Inc., Minneapolis, Minn.

[21] Appl. No.: 967,341

[22] Filed: Dec. 7, 1978

[51] Int. Cl.² .................. F25B 49/00; F25B 41/00; F04B 49/10
[52] U.S. Cl. .................................. 62/126; 62/209; 417/32
[58] Field of Search ............... 62/126, 127, 128, 129, 62/208, 209, 228 D, 228 R, 184; 417/32

[56] References Cited

U.S. PATENT DOCUMENTS

| | | | |
|---|---|---|---|
| 2,978,879 | 4/1961 | Heidorn | 62/209 |
| 3,047,696 | 7/1962 | Heidorn | 62/209 |
| 3,278,111 | 10/1966 | Parker | 417/32 |
| 3,729,949 | 5/1973 | Talbot | 62/127 |

*Primary Examiner*—William E. Wayner
*Assistant Examiner*—Harry Tanner
*Attorney, Agent, or Firm*—Roger W. Jensen

[57] ABSTRACT

A loss of refrigerant and/or high discharge temperature detection and control system for a reverse cycle refrigeration system by providing a fault indication whenever the temperature of the compressor discharge refrigerant is at or above a predetermined value (which value is a function of the magnitude of the outdoor air temperature) and which functions further by inhibiting the operation of the compressor of the reverse cycle refrigeration system whenever the temperature of the refrigerant at the compressor discharge exceeds a predetermined value above which the compressor would be damaged if it continued to operate.

3 Claims, 4 Drawing Figures

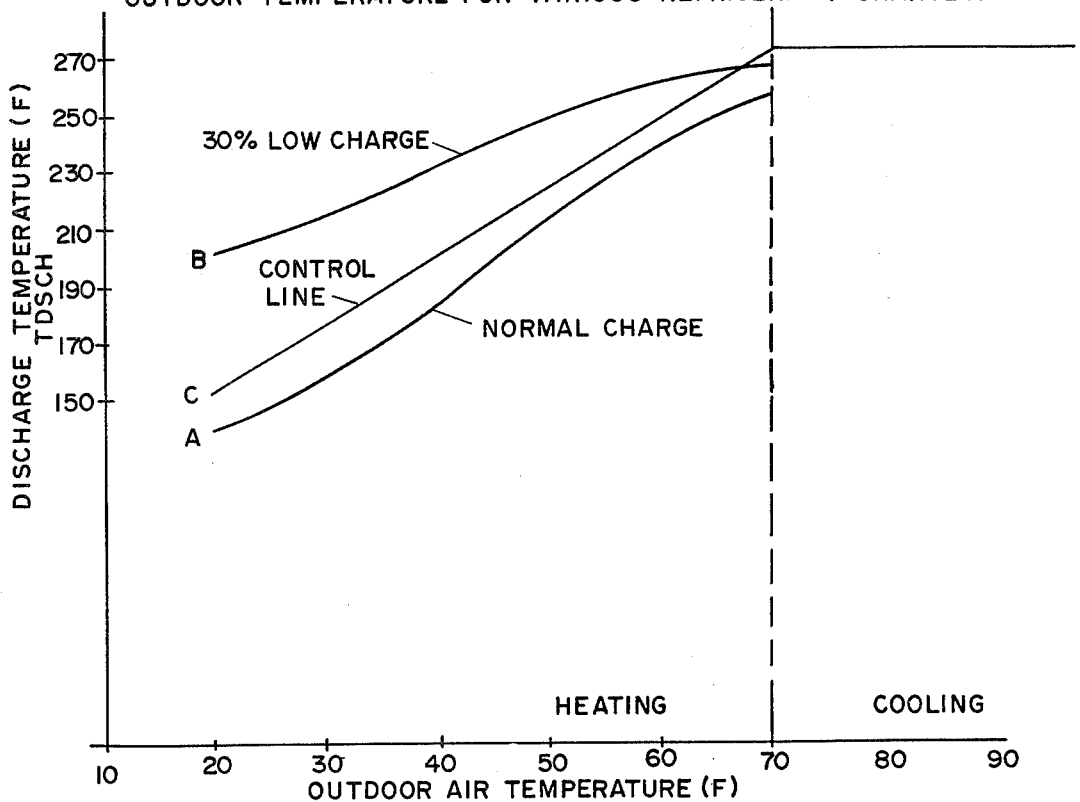
FIG. 2 DISCHARGE REFRIGERANT TEMPERATURE VERSUS OUTDOOR TEMPERATURE FOR VARIOUS REFRIGERANT CHARGES.
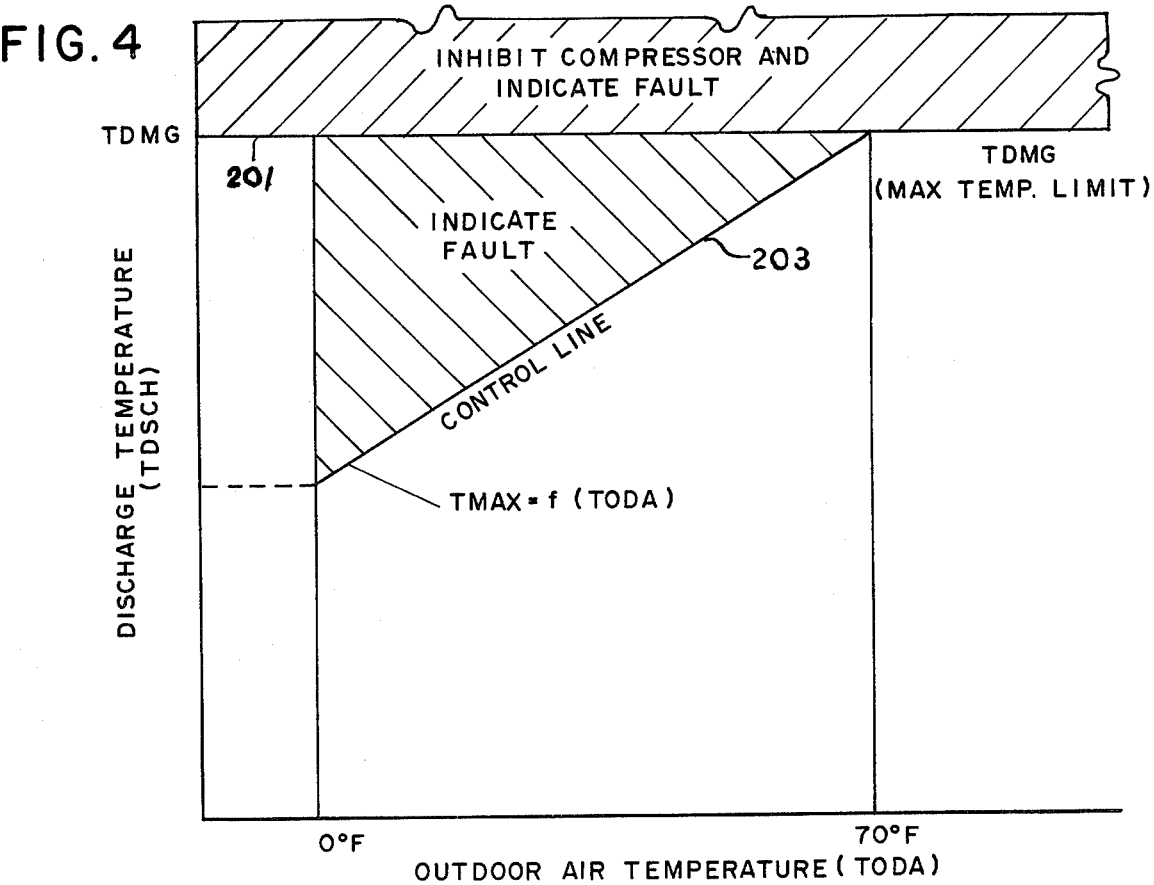
FIG. 4

4,220,010

LOSS OF REFRIGERANT AND/OR HIGH DISCHARGE TEMPERATURE PROTECTION FOR HEAT PUMPS

BACKGROUND OF THE INVENTION

Heat pumps are becoming increasingly popular for the heating and cooling of buildings because of their operating efficiencies; the cost effectiveness of heat pumps becoming of significant importance as energy costs increase. However, heat pumps are not without problems. One significant problem is the occasional and (usually) gradual loss of refrigerant from the closed system comprising the compressor indoor and outdoor coils, expansion means and interconnecting piping/tubing. Refrigerant leaks are fairly common in heat pump systems; they contribute significantly to losses in system efficiency and can, in extreme cases, contribute to complete failures of the system; e.g., irreparable damage to the compressor. All of the foregoing resulting in an increase in the number of service calls for the heat pumps and associated expense, inconvenience and discomfort for the occupants of the building being controlled.

Refrigerant leaks in the system are typically due to small pit holes in the refrigerant tubing, or loose fittings or poor connections. This will cause a gradual loss of the refrigerant charge in the system. When sufficient refrigerant has been lost, damage to the compressor may result because the refrigerant will rise to a sufficiently high discharge temperature to cause overheating of the compressor valves and/or a breakdown of the cooling oil in the compressor. Even prior to the compressor being damaged, it is desirable to detect the loss of refrigerant because as the refrigerant gradually leaks away, the overall efficiency of the heat pump is decreased significantly and this has obvious cost implications; in other words, the leaks will reduce the heating or cooling output per unit of input energy and this, over a period of time, could aggregate a staggering waste of energy.

Various prior art schemes have been devised for attempting to detect the loss of refrigerant and to disable the compressor to avoid damage thereto. For example, it is old to use a single set point thermostat for the measurement of the discharge temperature of the refrigerant from the compressor and to disable or inhibit the compressor at such predetermined limit. This has not been satisfactory because at low outdoor ambient temperatures the discharge temperature may not rise sufficiently to activate the thermostat, i.e., for low outdoor temperatures, the low level of refrigerant might go undetected.

Another prior art attempt to solve the low refrigerant problem is the use of a low pressure cutoff switch in the compressor suction line. The switch is intended to disable the compressor when the suction line pressure becomes too low, thus indicating a loss of charge of refrigerant. This has not been a satisfactory solution because low suction pressures are very common at low outdoor ambient temperatures; hence, it is very difficult to make satisfactory applications of this technique. Further, neither of the above two prior art schemes give any advance warning of loss of refrigerant prior to the compressor being disabled; i.e., none would indicate the gradual decrease in system efficiency brought about by the gradual loss of refrigerant.

An object of the present invention is to provide a new and significantly improved loss of refrigerant and/or high discharge temperature detection and control system having two features. First, the system will detect the loss of refrigerant at a very early point of the loss and will cause an indicator means to be actuated, thus alerting the occupants of the building that there is a system abnormality permitting prompt repair thereof before any significant loss of energy. Secondly, the system functions at all times to respond to the discharge temperature of the refrigerant being at or above a level above which the compressor would be damaged; the system then functions to indicate a fault to the occupants of the building and to disable or inhibit the operation of the compressor.

SUMMARY OF THE INVENTION

The present invention is a loss of refrigerant and/or high discharge temperature detection and control system for a reverse cycle refrigeration system comprising the usual refrigeration compression means, indoor coil, outdoor coil, refrigerant conduit means connecting the compression means and the coils, and refrigerant compression control means. In particular, the control system comprises outdoor air temperature sensing means having an output indicative of outdoor air temperature, compressor discharge temperature sensing means having an output indicative of the temperature of the refrigerant discharged from the refrigerant compression means, building temperature sensing means having an output indicative of a demand for heating or cooling of the building to be controlled, a fault indicator means, and a special controller means. The special controller means has operative connections to the above recited temperature sensing means so as to receive the outputs thereof. The controller means further includes a circuit connection-disconnection means for selectively interconnecting the building temperature sensing means to the refrigerant compression control means, the building temperature sensing means output normally being connected to the refrigerant compression control means so as to cause the compressor to run or operate whenever there is a demand for heating or cooling of the building.

The controller means has a connection to the fault indicator means and is further characterized by being adapted to actuate the fault indicator whenever the discharge temperature is at or above a predetermined value (hereinafter referred to as "TMAX"), TMAX being a function of the magnitude of the outdoor temperature; thus providing a warning to the building occupants that refrigerant has been lost and that energy is being wasted and further that, if continued, a compressor inhibition may occur. The controller means further is responsive to the magnitude of the refrigerant discharge temperature and is effective whenever the discharge temperature is at or above a predetermined value (hereinafter referred to as "TDMG") both to actuate the fault indicator and to inhibit the compressor from operating; thus, protecting the compressor from damage which would otherwise occur if it kept operating at or above TDMG and also to signal the problem to the occupants of the building.

Thus, we have provided an early warning system which detects a loss of refrigerant and/or a high discharge temperature at an early point by comparing TDSCH to a predetermined maximum value TMAX with this maximum value itself being a function of the magnitude of outdoor temperature. We recognize that the system may be operated without damage thereto as long as the discharge temperature is below a predetermined value (TDMG); accordingly, we establish the following conditions of operation of our system. First, when the discharge temperature is between TMAX and TDMG, the system is operated as usual; i.e., the compressor is not inhibited, but an indicator light or means is operated to warn building occupants that service is required; i.e., the refrigerant charge is low (system is operating inefficiently) but damage to the compressor is not imminent. Further, when the discharge temperature is greater than TDMG, then our invention functions to inhibit the compressor system from operating, and the indicator light continues to operate.

BRIEF DESCRIPTION OF THE DRAWINGS

FIG. 2 is a graph showing the temperature of the discharge refrigerant plotted as a function of outdoor air temperature;

FIG. 4 is a graph showing refrigerant discharge temperature plotted as a function of outdoor air temperature and further showing a control line exemplifying the operation of the subject invention.

DESCRIPTION OF THE PREFERRED EMBODIMENT

Figure 1:
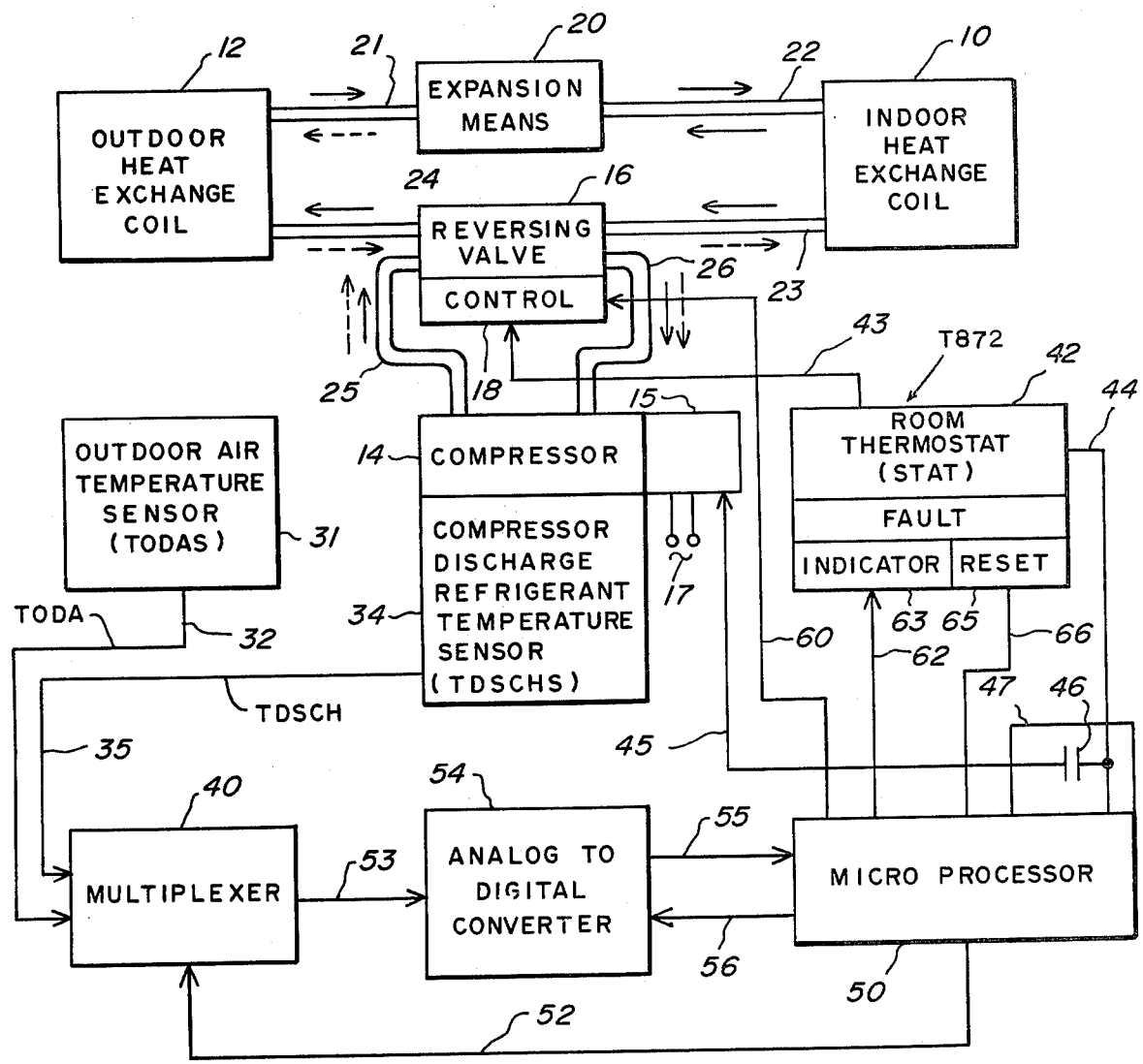
FIG. 1 is a block diagram of a loss of refrigerant and/or high discharge temperature detection and control system for a reverse cycle refrigeration system embodying the present invention.

Referring to FIG. 1, the reverse cycle refrigeration system comprises an indoor heat exchange coil 10, an outdoor heat exchange coil 12, a refrigerant compression means or compressor 14, a compressor controller 15 energized from an appropriate source 17 of electrical energy, and refrigerant conduit means interconnecting the coils and compressor, the conduit means including the usual reversing valve 16 having a controller 18, an expansion means 20, and appropriate interconnecting piping 21-26. The system above described is representative of prior art system such as that shown in the U.S. Pat. No. 3,170,304. As is well known, such systems function whenever the building thermostat is calling for heating or cooling to cause the compressor 14 to operate. If heating is being demanded, then the compressed hot refrigerant from the compressor 14 will be routed through the reversing valve 16 toward the indoor heat exchange coil 10 where its heat is given up to heat indoor air. Conversely, if cooling of the building is being demanded, then the hot refrigerant from the compressor is routed through the reversing valve to the outdoor heat exchange coil where the refrigerant is cooled for subsequent use indoors to cool the building.

The compressor loss of refrigerant and/or high discharge temperature detection and control system as depicted in FIG. 1 comprises an outdoor air temperature sensing means 31 (hereinafter sometimes referred to as "TODAS") having an output 32 on which is a signal indicative of the outdoor air temperature (hereinafter sometimes referred to as "TODA"). TODA on 32 comprises one of two inputs to a multiplexer 40 to be described in more detail below. The detection and control system further comprises a compressor discharge refrigerant temperature sensing means (hereinafter sometimes referred to as "TDSCHS") 34 having an output 35 (connected to multiplexer 40 as the second input thereof) on which is a signal indicative of the temperature of the refrigerant on the discharge side of compressor 14, said signal hereinafter sometimes being referred to as "TDSCH". The detection and control system further includes a room thermostat 42 (hereinafter sometimes referred to as "STAT") which responds to the temperature of a room or space in a building or the like, the temperature of which is to be controlled by the reverse cycle refrigeration system. Room thermostat 42 is depicted as having a first output 43 connected to the control 18 for the reversing valve 16 and a second output 44 connected to a microprocessor 50 and also, through a set of normally closed contacts 46 and a connection means 45, to the controller 15 of compressor 14. Contacts 46 are contained within a subsection 47 of the microprocessor 50 and both 47 and 50 will be described in more detail below.

A Honeywell Inc. Model T782 heating-cooling thermostat may be used for the room thermostat 42 depicted in FIG. 1, the Model T872 being of the bimetal operated mercury switch type including switch means for providing the heating-cooling control signals and also for controlling a plurality of auxiliary heating means. As will be understood, whenever STAT 42 calls for either heating or cooling of the controlled space, then a control signal is effectively supplied on outputs 43 and 44 thereof; the control signal at 43 functioning to position via control 18 the reversing valve 16 to the proper orientation for either heating or cooling of the building. The control signal on 44 as applied to microprocessor 50 functions to indicate when either the heating mode or the cooling mode has been commanded or selected by the STAT 42; i.e., to indicate a demand for compressor operation. The control signal at 44 is also transmitted through the normally closed contacts 56 and connection 45 to control the compressor 14 from a rest or "off" position to an operating or "on" condition. The Honeywell Model T872 STAT further includes a fault indicator 63 and a fault reset means 65; e.g., a switch, both of which will be described in further detail below. For convenience, elements 42, 63 and 65 as above described are shown adjacent to one another in FIG. 1, all having the common designator T872.

Honeywell Inc. platinum film resistance type temperature sensors models C800A and C800C may be used for TODAS 31 and TDSCHS 34 respectively. Also, a Westinghouse Inc. HI-RE-LI unit comprising an outdoor unit model no. HL036COW and indoor unit AG012HOK may be used for the basic heat pump unit depicted in FIG. 1; i.e., components 10, 12, 14, 15, and 16.

Multiplexer 40 thus has applied thereto at 32 and 35 analog signals representative of TODA and TDSCH respectively. The function of the multiplexer 40 is to supply one or the other of the two input signals in analog form to the output 53 thereof, depending upon the nature of the control signal being applied to the multiplexer 40 via a connection 52 from the microprocessor 50; i.e., the microprocessor provides a control for the multiplexer 40 to select which of the two input signals is applied to output 53. Output 53 is applied as the input to a standard analog-to-digital converter 54 (hereinafter sometimes referred to as "A/D") having an output 55 connected as a second input to the microprocessor 50 and also having an input 56 for receiving controlling instructions from the microprocessor 50. The output from analog-to-digital converter 54 at connection 55 is a signal in digital form indicative of the analog signal applied to input 53.

The microprocessor has a first output connection 60 which is connected to the control 18 of the reversing valve 16 so as if desired, to control the reversing valve independently of the control supplied to control 18 from the room thermostat 42. The microprocessor 50 has a second output 62 connected to fault indicator 63. In the T872 the fault indicator 63 is a warning light; other visual or audible alarms may be used. The fault reset means 65, i.e., switch, is connected by a suitable connection 66 to the microprocessor 50 to constitute a third input thereof.

A suitable microprocessor that may be used in the present invention as a component of the system depicted in FIG. 1 is the Intel Corporation Model 8049; a suitable representative analog-to-digital convertor for use to provide the function of block 54 in FIG. 1 is the Texas Instrument Inc. Model TL505C (see TI Bulletin DL-S 12580); and an appropriate multiplexer is the Motorola Inc. Model MC14051BP.

It will be understood by those skilled in the art that the functional interconnections depicted in FIG. 1 are representative of one or more electrical wires or pipes, as the case may be, and that other equipment may be required to provide voltages and currents necessary to interconnect the various devices, as dictated by the specific equipment used.

Referring to FIG. 2, the graph of discharge refrigerant temperature plotted versus outdoor air temperature, curve A of the figure shows the variation of the aforesaid for a normal charge of refrigerant in the line. It will be noted that TDSCH is approximately 140° F. for a TODA of 20° F. and that as TODA increases, there is a corresponding and somewhat linear increase in the value of TDSCH so that for a TODA of 70° F. TDSCH is approximately 250° F.

Curve B of FIG. 2 shows the relationship between TDSCH and TODA when the refrigerant charge in the line is 30% low; i.e., representative of the situation where there has been a prolonged small leak of refrigerant in the system. It will be noted that the TDSCH for curve B corresponding to a TODA of 20° is much higher than that for a normal charge, a temperature of approximately 200° F. being depicted in FIG. 2. As TODA increases, there is a corresponding somewhat linear increase in the value TDSCH but the rate of increase is not as great as that for curve A. In FIG. 2 a control line C is depicted being placed slightly above curve A and extending generally parallel thereto until it reaches the point corresponding to TODA being 70° which is representative of the breakpoint between heating and cooling for the temperature control system; at that point, the control line extends further to the right on a horizontal basis. The control line will be discussed in further detail in connection with FIG. 4 below.

Figure 3:
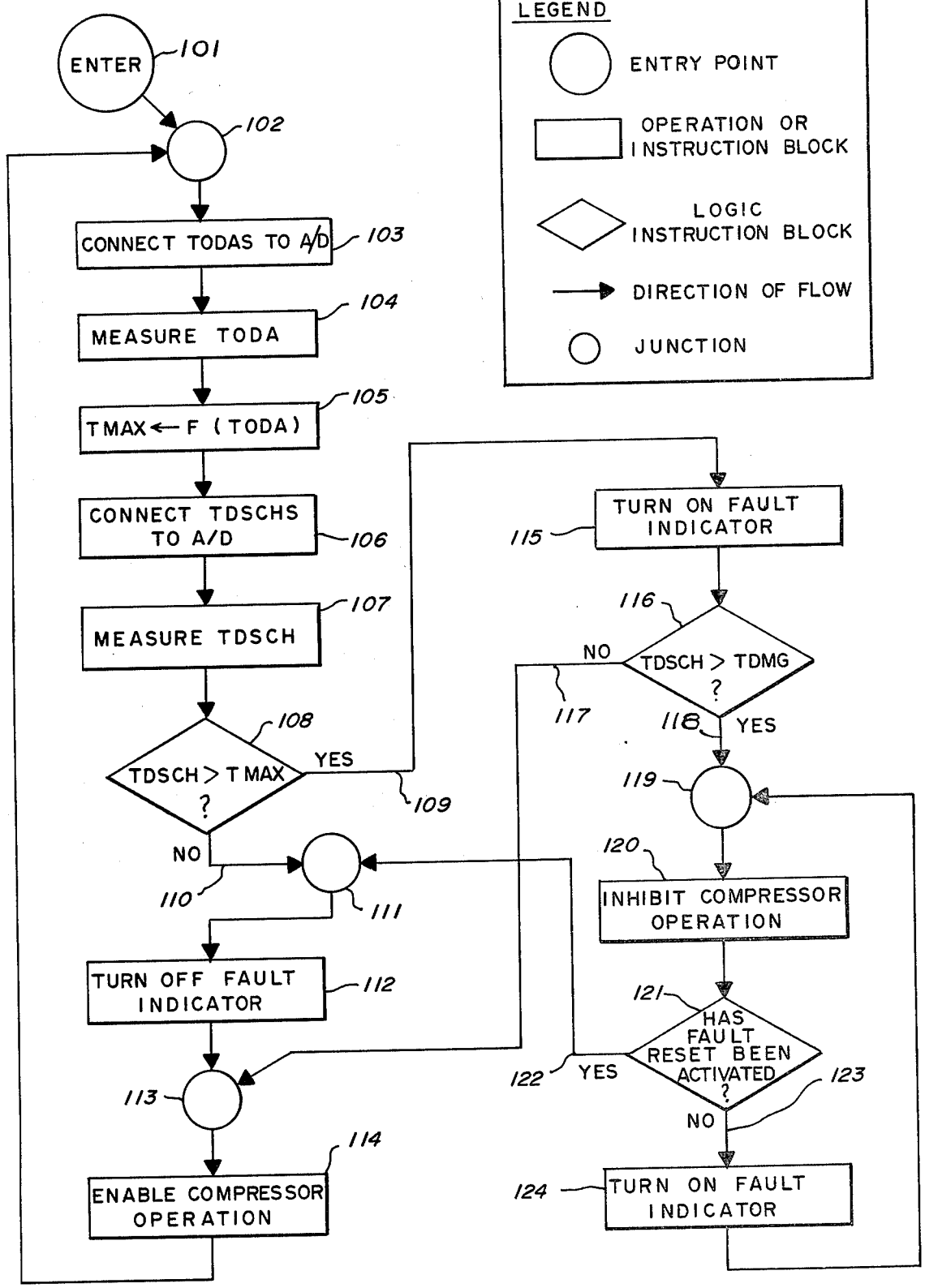
FIG. 3 is a flow diagram for the control of the microprocessor included in the apparatus of FIG. 1.

The detailed operation of the detection and control system of FIG. 1 may be more specifically understood by reference to the flow chart depicted in FIG. 3. In FIG. 3 an entry point 101 "enter" is representative of the system power being applied, i.e., the heat pump being powered up by power 17 being applied to compressor controller 15 and electrical energization also being supplied to any other apparatus in the control system requiring same. The system then flows via junction 102 to operation instruction block 103 "connect TODAS to A/D", the flow from which is to operation instruction block 104 "measure TODA", the flow from which is to operation instruction block 105 "TMAX is set to F(TODA)" being representative of the computation of TMAX for the particular value of TODA measured at 104. The flow from 105 is to operation instruction block 106 "connect TDSCHS to A/D"; here the microprocessor 50 through the connection 52 to the multiplexer 40 arranges to have the TDSCH signal at output 35 from sensor 34 applied from the output 53 of multiplexer 40 to the A/D converter 54. The flow from 106 is to operation instruction block 107 "measure TDSCH", the flow from which is to logic instruction block 108 "TDSCH is greater than TMAX?" a "yes" response at 109 flows to an operation instruction block 115 "turn on fault indicator". The building occupants are thus alerted by the actuation of the fault indicator 63 that TDSCH is greater than TMAX, and that the heat pump system is operating with a low charge of refrigerant and hence is operating improperly.

However, if TDSCH is not greater than TMAX at logical instruction 108, then this is indicative of a properly operating system and accordingly, a "no" response from block 108 flows via branch 110 and junction 111 to an operation instruction block 112 "turn off fault indicator" the flow from which is via a junction 113 to an operation instruction block 114 "enable compressor operation" the flow from which is back to the junction 102.

Returning again to operation instruction block 115 "turn on fault indicator" it is seen that the flow therefrom is to logic instruction block 116 "TDSCH is greater than TDMG?" which is representative of the comparison between the instantaneous TDSCH and the predetermined TDMG, i.e., that value of TDSCH above which damage could be done to the compressor. In any event, a "no" response from 116 is indicative of TDSCH being below the value of TDMG and accordingly such "no" response at 117 is applied via junction 113 to block 114 to enable the compressor operation, i.e., the heat pump compressor may continue to operate although it will be understood that the fault indicator 63 has been actuated to signal to the building occupants that there is a condition of low refrigerant in the system with its attendant consequences of decreased heating efficiency, lower heat output, and possible eventual shutdown of the compressor on the probability that eventually TDSCH will become excessively high. Thus, the building occupants may want to take initiatives to have the problem of the low refrigerant charge corrected.

If the value of TDSCH is greater than the predetermined TDMG, then in order to avoid damaging the compressor it is necessary to inhibit the compressor operation, and this is accomplished by having the yes response from 116 flow via 118 to a junction 119 and from thence to an operating instruction block 120 "inhibit compressor operation". Referring to FIG. 1, this is accomplished by the microprocessor 50 functioning to open up the contacts 46 so as to break the circuit between STAT 42 and controller 15 of the compressor 14, i.e., the connection from output 44 of STAT 42 through contact 46 and connection 45 to the controller 15.

As indicated above, a fault reset means 65 is provided in the system. Referring to FIG. 3, the flow from instruction block 120 is to logic instruction block 121 "has fault reset been actuated?", a "no" response 123 flows to an operation instruction block 124 "turn on fault indicator" the flow from which is to junction 119; a "yes"

response from 121 flows at 122 to junction 111 and from thence to block 112 so as to turn off the fault indicator.

Referring to FIG. 4, the compressor refrigerant discharge temperature, TDSCH, is plotted on the vertical axis and outdoor air temperature TODA is plotted on the horizontal axis. The maximum temperature limit, or TDMG, for TDSCH is shown and identified by the reference numeral 201. Whenever TDSCH is at or above the value of temperature represented by TDMG, then the system functions to both inhibit the compressor and also to indicate the fault. Below that point the system functions to be responsive to the value of TDSCH and if it is at or above the value of TMAX, then the system functions to indicate the fault as aforesaid. In FIG. 4 the control line is identified by the reference numeral 203 and also by the legend "TMAX=f-(TODA". Control line 203 of FIG. 4 is intended to correspond to the control line C of FIG. 2. Thus, TMAX begins at a relatively low point for a low TODA and increases in a linear fashion for an increase in TODA until it reaches the point corresponding to TDMG or the maximum temperature limit line 201.

To review the fault indicator 63 will always be actuated if the discharge temperature TDSCH is equal to or greater than TMAX; in addition, if the discharge temperature is equal to or greater than TDMG then the system functions to additionally inhibit the compressor. The building occupants will be advised of the problem by the actuation of the fault indicator 64. They may attempt to reset the system through use of the fault reset means 65. If the fault indicator continues to indicate a fault, then the operator may check the running condition of the compressor. If the compressor continues to run, then the operator knows that the system has a charge of refrigerant which is low but not dangerously low; this, however, is a clear indication of a system that is operating with below normal heating capacity and resulting inefficiencies. If the compressor operation has been inhibited, then the operator knows that the charge of refrigerant has decreased to a dangerously low point and that the compressor is inhibited from any further operation until the low refrigerant problem has been corrected.

As indicated above, an Intel Model 8049 microprocessor may be used to practice the subject invention; as an assistance reference may be made to "INTEL$^R$ MCS-48$^{TM}$ Family of Single Chip Microcomputers—User's Manual", a 1978 copyrighted manual of the Intel Corporation, Santa Clara, California 95051.

While we have described a preferred embodiment of our invention, it will be understood that the invention is limited only by the scope of the following claims:

We claim:

1. A loss of refrigerant and/or high discharge temperature detection and control system (hereinafter "control system") for a reverse cycle refrigeration system (hereinafter "system") for heating and cooling a building wherein said system comprises refrigerant compression means, refrigerant compression control means, an indoor coil, an outdoor coil, and refrigerant conduit means connecting said compression means and said coils, said control system comprising:
   outdoor air temperature sensing means (hereinafter "TODAS") having an output indicative of outdoor air temperature (hereinafter "TODA");
   compressor discharge temperature sensing means (hereinafter "TDSCHS") having an output indicative of the temperature (hereinafter "TDSCH") of the refrigerant discharged from said refrigerant compression means; and
   building temperature sensing means (hereinafter "STAT") having an output indicative of a demand for heating or cooling of the building;
   fault indicator means; and
   controller means having operative connections to said TODAS, TDSCHS, and STAT so as to receive the outputs thereof, said controller means including circuit connect-disconnect means selectively interconnecting said STAT output to said refrigeratant compression control means whereby, when said STAT output is connected thereto, said compression means is enabled to operate and, when said STAT output is disconnected therefrom, said compression means is inhibited from operating, said controller means being connected to said fault indicator and including (i) means responsive to the magntides of TDSCH and TODA and effective to actuate said fault indicator whenever TDSCH is at or above a predetermined value (hereinafter "TMAX"), TMAX being a function of the magnitude of TODA, and (ii) means responsive to the magnitude of TDSCH and effective whenever TDSCH is at or above a predetermined value (hereinafter "TDMG") both to actuate said fault indicator and to disconnect said STAT output from said refrigerant compression control means to thereby inhibit said compression means from operating.

2. Apparatus of claim 1 further characterized by said control system including fault reset means connected to said controller means and effective when operated to reset said system subsequent to said compression means being inhibited as aforesaid.

3. Apparatus of claim 1 further characterized by the TDMG value of TDSCH always being equal to or greater than the TMAX value of TDSCH.

* * * * *